United States Patent
Orlov et al.

(10) Patent No.: US 10,647,783 B2
(45) Date of Patent: May 12, 2020

(54) METHOD FOR PREPARING MODIFIED NANOCRYSTALLINE CELLULOSE

(71) Applicant: The Research Foundation for the State University of New York, Albany, NY (US)

(72) Inventors: Alexander Orlov, Stony Brook, NY (US); Daniel Knopf, Huntington, NY (US); Robert Grubbs, Miller Place, NY (US); Girish Ramakrishnan, Stony Brook, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 81 days.

(21) Appl. No.: 15/771,141

(22) PCT Filed: Oct. 26, 2016

(86) PCT No.: PCT/US2016/058748
§ 371 (c)(1),
(2) Date: Apr. 27, 2018

(87) PCT Pub. No.: WO2017/074983
PCT Pub. Date: May 4, 2017

(65) Prior Publication Data
US 2019/0055324 A1    Feb. 21, 2019

Related U.S. Application Data

(60) Provisional application No. 62/246,842, filed on Oct. 27, 2015.

(51) Int. Cl.
*C08B 15/05*    (2006.01)
*C08B 11/14*    (2006.01)
(Continued)

(52) U.S. Cl.
CPC .......... *C08B 15/05* (2013.01); *B01J 13/0095* (2013.01); *B01J 19/08* (2013.01); *C08B 11/14* (2013.01);
(Continued)

(58) Field of Classification Search
CPC ......... C08B 15/05; C08B 11/14; C08B 15/00; C08B 15/02; C08B 15/06; B01J 13/0095; B01J 19/08
See application file for complete search history.

(56) References Cited

U.S. PATENT DOCUMENTS 2,824,778 A * 2/1958 Robbart ................. D06M 11/78
                                                      8/116.1
4,994,107 A    2/1991 Flagan et al.
(Continued)

FOREIGN PATENT DOCUMENTS

WO    WO-2014096188 A1 *  6/2014
WO    WO-2014096192 A2 *  6/2014

OTHER PUBLICATIONS

F. Siffer et al., "A Chemometric Investigation of the Effect of the Process Parameters During Maleic Anhydride Pulsed Plasma Polymerization," 539 Analytica Chimica Acta 289 (2005).*
(Continued)

*Primary Examiner* — Nicholas E Hill
(74) *Attorney, Agent, or Firm* — Carter, DeLuca & Farrell LLP

(57) ABSTRACT

The present disclosure provides methods for functionalizing the surfaces of cellulose nanoparticles. In embodiments, nanoparticles are aerosolized, and then passed through a flow reactor where they are contacted with gaseous reactants to functionalize the surface of the nanoparticles. In other embodiments, the nanoparticles are aerosolized, and then passed through a plasma reactor where they are contacted
(Continued)

with gaseous reactants to functionalize the surface of the nanoparticles. Once the functionalized nanoparticles are produced, they may be combined with polymers to form polymer composites having both a polymer and the functionalized nanoparticles. Systems for producing these functionalized nanoparticles, coupled with downstream polymer processing equipment for forming the polymer composites, are also provided.

14 Claims, 5 Drawing Sheets

(51) Int. Cl.
    *C08B 15/00*      (2006.01)
    *C08B 15/02*      (2006.01)
    *B01J 13/00*      (2006.01)
    *B01J 19/08*      (2006.01)
    *C08B 15/06*      (2006.01)
    *C08L 1/02*      (2006.01)

(52) U.S. Cl.
    CPC .............. *C08B 15/00* (2013.01); *C08B 15/02* (2013.01); *C08B 15/06* (2013.01); *C08L 1/02* (2013.01); *B01J 2219/0886* (2013.01); *B01J 2219/0896* (2013.01)

(56) References Cited

U.S. PATENT DOCUMENTS

| | | | |
|---|---|---|---|
| 2008/0118765 A1 | 5/2008 | Dorgan et al. | |
| 2008/0146701 A1* | 6/2008 | Sain | B82Y 30/00 524/9 |
| 2011/0218336 A1 | 9/2011 | Kohno et al. | |
| 2014/0130710 A1 | 5/2014 | Laukkanen et al. | |
| 2015/0135993 A1* | 5/2015 | Buckland | B01J 19/087 106/287.24 |

OTHER PUBLICATIONS

P. Samyn et al., "Plasma Deposition of Polymer Composite Films Incorporating Nanocellulose Whiskers," 56 European Physical Journal: Applied Physics, EDP Sciences 24,015 (2011), https://hal.archives-ouvertes.fr/hal-00746203 (12-page document).*
Matthieu Fumagalli et al., "Gas-Phase Esterification of Cellulose Nanocrystal Aerogels for Colloidal Dispersion in Apolar Solvents," 9 Soft Matter 11,309 (2013).*
English-language machine translation of WO-2014096188-A1, performed on Espacenet on Oct. 27, 2019.*
English-language machine translation of WO-2014096192-A2, performed on Espacenet on Oct. 27, 2019.*
International Search Report and Written Opinion from Appl. No. PCT/US16/58748 dated Mar. 2, 2017 (16 pages).

* cited by examiner

METHOD FOR PREPARING MODIFIED NANOCRYSTALLINE CELLULOSE

CROSS REFERENCE TO RELATED APPLICATIONS

This application is a National Stage of, and claims priority to and the benefit of, International Patent Application No. PCT/US2016/058748 filed on Oct. 26, 2016, which, in turn, claims the benefit of, and priority to, U.S. Provisional Patent Application Ser. No. 62/246,842, filed Oct. 27, 2015, the entire disclosure of which is incorporated by reference herein.

BACKGROUND

Composites, which may be formed of various materials, have been used extensively in civil infrastructure applications, and they continue to be utilized in new and existing structures via retrofits, rehabilitations, and repairs. The use of nano materials is revolutionizing the properties of the existing composites. For example, carbon nanotube (CNT) based composites have been developed. CNTs can provide nano composites with extraordinary stiffness, strength and resilience.

However, there are several concerns related to using nano tubes as nano fillers, including significant energy consumption related to CNT manufacturing, substantial costs of currently sold CNTs, as well as contradictory data related to their toxicity.

There is growing interest in the development of nanocomposites including organic polymers and various nano materials. However, many conventional nano fillers are currently not compatible with existing polymer matrices, which limits their practical applications. For example, several strategies used to address the issues related to cellulose incompatibility in non-polar matrices include cellulose surface modification using relatively harsh energy-consuming conditions and toxic chemicals. More specifically, these strategies may include such surface treatment techniques as silylation, mercerization, treatment with peroxide, benzoylation, and graft copolymerization.

Improved materials, including nanocomposites based upon organic materials, remain desirable.

SUMMARY

The present disclosure provides methods and systems for producing nanocomposites based upon organic materials. In embodiments, a method of the present disclosure includes aerosolizing cellulose nanoparticles; introducing the aerosolized cellulose nanoparticles into an aerosol flow reactor; introducing gaseous silanes into the aerosol flow reactor; allowing the gaseous silanes to functionalize the surface of the cellulose nanoparticles as they pass through the aerosol flow reactor to produce functionalized cellulose nanoparticles; and collecting the functionalized cellulose nanoparticles.

In embodiments, the silane possesses functional groups such as amino, vinyl, methacryl, mercapto, glycidoxy, chloro, azide, alkyl, and combinations thereof. In some embodiments, the silane may be 3-aminopropyl triethoxysilane, vinyltrimethoxysilane, 3-methacryloxypropyltrimethoxysilane, γ-mercapto propyltriethoxy silane, glycidoxypropyltrimethoxy-silane, dichlorosilane, vinyltrimethoxysilane grafted polypropylene, vinyltrimethoxysilane grafted polyethylene, azidotrimethylsilane, hexadecyltrimethoxysilane, and combinations thereof.

In embodiments, the flow rate of the aerosolized cellulose nanoparticles in the aerosol flow reactor is from about 1 cubic centimeter per minute to about 10 cubic feet per minute.

In some embodiments, suitable residence times of the aerosolized cellulose nanoparticles in the aerosol flow reactor may be from about 0.1 second to about 100 minutes.

In embodiments, the concentration of the aerosolized cellulose nanoparticles in the aerosol flow reactor is from about 1 part per billion to about 10000 parts per million.

In some embodiments, the concentration of the silanes in the aerosol flow reactor is from about 1 part per billion to about 10000 parts per million.

In embodiments, the temperature in the aerosol flow reactor is from about 20° C. to about 250° C.

Methods of the present disclosure may further include, in embodiments, combining the collected functionalized cellulose nanoparticles with a polymer to form a polymer composite.

In some embodiments, the polymer is based upon a polymer such as polylactic acid, polyethylene, polypropylene, acrylonitrile-butadiene styrene, polyvinyl alcohol, polyethylene terephthalate, butyl rubber, natural rubber, polyacrylate, polyvinyl chloride, polysulfide, polystyrene, and combinations thereof.

In embodiments, the collected functionalized cellulose nanoparticles are combined with the polymer at a polymer feed rate from about 1 kilogram/hour to about 100 kilograms/hour.

In some embodiments, the polymer composite includes the polymer in amounts from about 50% by weight to about 99.9% by weight of the polymer composite.

In embodiments, the polymer composite includes the functionalized cellulose nanoparticles in amounts from about 0.1% by weight to about 50% by weight of the polymer composite.

In other embodiments, a method of the present disclosure includes aerosolizing cellulose nanoparticles; introducing the aerosolized cellulose nanoparticles into a plasma flow reactor possessing at least two electrodes therein; introducing reactive gas radicals into the plasma flow reactor; allowing the reactive gas radicals to functionalize the surface of the cellulose nanoparticles as they pass through the plasma flow reactor to produce functionalized cellulose nanoparticles; and collecting the functionalized cellulose nanoparticles.

In embodiments, the temperature in the plasma flow reactor is from about 20° C. to about 250° C.

In some embodiments, the flow rate of the aerosolized cellulose nanoparticles in the plasma flow reactor is from about 1 cubic centimeter per minute to about 10 cubic feet per minute.

In embodiments, the residence time of the aerosolized cellulose nanoparticles in the plasma flow reactor is from about 0.1 second to about 100 minutes.

In some embodiments, the concentration of the aerosolized cellulose nanoparticles in the plasma flow reactor is from about 1 part per billion to about 10000 parts per million.

In embodiments, the reactive gas radicals are derived from gases such as oxygen, nitrogen, hydrogen, water, carbon tetrachloride, tetrafluoromethane, and combinations thereof.

In some embodiments, the frequency in the plasma flow reactor is from about 1 MHz to about 1000 MHz.

In embodiments, the output power of the plasma flow reactor is from about 25 W to about 50 kW.

In some embodiments, the gas pressure in the plasma flow reactor is from about 1 Pa to about 200 Pa.

In embodiments, methods of the present disclosure using a plasma flow reactor further include combining the collected functionalized cellulose nanoparticles with a polymer to form a polymer composite.

In some embodiments, the polymer is based upon a polymer such as polylactic acid, polyethylene, polypropylene, acrylonitrile-butadiene styrene, polyvinyl alcohol, polyethylene terephthalate, butyl rubber, natural rubber, polyacrylate, polyvinyl chloride, polysulfide, polystyrene, and combinations thereof.

In embodiments, the collected functionalized cellulose nanoparticles are combined with the polymer at a polymer feed rate from about 1 kilogram/hour to about 100 kilograms/hour.

In some embodiments, the polymer composite includes the polymer in amounts from about 50% by weight to about 99.9% by weight of the polymer composite.

In embodiments, the polymer composite includes the functionalized cellulose nanoparticles in amounts from about 0.1% by weight to about 50% by weight of the polymer composite.

Systems of the present disclosure include, in embodiments, an aerosol generator for generating aerosolized cellulose nanoparticles; an aerosol flow reactor for functionalizing the aerosolized cellulose nanoparticles with silanes to produce functionalized cellulose nanoparticles; and a mixer for mixing the functionalized cellulose nanoparticles with a polymer to form a polymer composite.

In other embodiments, systems of the present disclosure include an aerosol generator for generating aerosolized cellulose nanoparticles; a plasma flow reactor for functionalizing the aerosolized cellulose nanoparticles with reactive gas radicals to produce functionalized cellulose nanoparticles; and a mixer for mixing the functionalized cellulose nanoparticles with a polymer to form a polymer composite.

Systems of the present disclosure, whether including aerosol flow reactors or plasma flow reactors, may also possess an extruder for final processing of the polymer composite.

BRIEF DESCRIPTION OF THE DRAWINGS

Various embodiments of the present disclosure will be described herein with reference to the following figures, wherein.

DETAILED DESCRIPTION

Figure 1A:
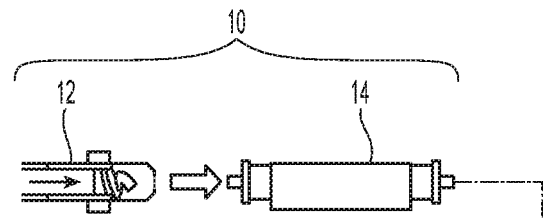
FIGS. 1A, 1B and 1C are depictions of an embodiment of the present disclosure for a system for the aerosol modification of nanocrystalline cellulose, including aerosol production (FIG. 1A) and chemical functionalization of the aerosol (FIG. 1B), to downstream polymer/composite processing equipment (FIG. 1C) for manufacturing polymer nanocomposites of the present disclosure.

The present disclosure addresses the challenges related to the use of traditional nano fillers in forming composites, while maintaining the structural integrity of nano composites, by using sustainable bio-based nano fillers. The present disclosure provides a new nano manufacturing approach for making such materials. The methods of the present disclosure include rapid, fast, and scalable methods of cellulose modification where a fast surface reaction can be performed while nanoparticles are maintained separate in a laminar flow of gases.

In embodiments, the nano materials to be functionalized in accordance with the present disclosure include nano crystalline cellulose ("NCC"), nanofibrillated cellulose, bacterial nanocellulose, microfibrillated cellulose, combinations thereof, and the like. The nanoparticles, in embodiments NCC nanoparticles, may have a diameter from about 1 nm to about 500 nm, in embodiments from about 10 nm to about 100 nm.

In accordance with the present disclosure, using nano cellulose as a filler can be a very promising and scalable method of producing inexpensive and environmentally friendly ("green") composites.

The present disclosure provides controlled modification of the cellulose nanoparticles in aerosolized form by reacting the nanoparticles with gas phase chemical modifiers in a flow reactor. The methods are related to atmospheric chemistry, and are applied to airborne nanoparticles formed of industrially relevant materials which can be modified in flight.

Surface modification of aerosolized cellulose nanoparticles requires the use of rapid reactions employing reagents that are compatible with the aerosol ionization processes. The present disclosure provides controlled modification of cellulose nanoparticles by using aerosolized cellulose nanoparticles reacted with silanes or other chemical species such as isocyanates, sulfonamides, anhydrides, combinations thereof, and the like, which are capable of changing the chemical nature of the surface of the nanoparticles.

These gas-to-particle reactions, also referred to herein, in embodiments, as "heterogeneous chemical reactions" and/or "heterogeneous reactions", represent the processes encountered in the atmosphere and have been studied using established methods in the laboratory.

Suitable silanes used to functionalize the cellulose nanoparticles may possess functional groups such as amino, vinyl, methacryl, mercapto, glycidoxy, chloro, azide, alkyl, and combinations thereof.

Table 1 below shows various silanes that may be used to functionalized cellulose in accordance with the present disclosure, and the resulting natural particle/polymer composites (including chemical structures, organo-functionalities and target polymer matrices) which may then be produced.

TABLE 1

| Structure | Functionality | Abbreviation | Target Matrix |
|---|---|---|---|
| $(RO)_3Si-(CH_2)_3-NH_2$ | Amino | APS | Expoxy, Polyethylene, Butyl Rubber, Polyacrylate, PVC |
| $(RO)_3Si-CH=CH_2$ | Vinyl | VTS | Polyethylene, Polypropylene, Polyacrylate |
| $(RO)_3Si-(CH_2)_3-OOC(CH_3)C=CH_2$ | Methacryl | MPS | Polyethylene, Polyester |
| $(RO)_3Si-(CH_2)_3-SH$ | Mercapto | MRPS | Natural Rubber, PVC |
| $(RO)_3Si-(CH_2)_3-O-CH_2CHCH_2O$ | Glycidoxy | GPS | Epoxy, Butyl Rubber, Polysulfide |
| $R_2Si-Cl_2$ | Chlorine | DCS | Polyethylene, PVC |
| VTS Grafter Plastics | Vinyl | VSPP, VSPE | Polyethylehe, Polypropylene |
| $(RO)_3Si-R''-N_3$ | Azide | ATS | Polyethylene, Polypropylene, Polystyrene |
| $(RO)_3Si-(CH_2)_{15}CH_3$ | Alkyl | HDS | Polyethylene, Natural rubber |

As used in Table 1, R may be any of the resins mentioned in the target matrix section of the table above, and examples of the various silanes include 3-aminopropyl triethoxysilane (APS), vinyltrimethoxysilane (VTS), 3-methacryloxypropyltrimethoxysilane (MPS), γ-mercapto propyltriethoxy silane (MRPS), glycidoxypropyltrimethoxy-silane (GPS), dichlorosilane (DCS), vinyltrimethoxysilane grafted polypropylene (VSPP), vinyltrimethoxysilane grafted polyethylene (VSPE), azidotrimethylsilane (ATS), hexadecyltrimethoxysilane (HDS), combinations thereof, and the like.

In accordance with the present disclosure, the silanes utilized, which are very versatile reagents, are capable of making NCCs compatible with various polymer matrices. The use of reactive alkylsilane derivatives that can react with surface hydroxyl groups on the cellulose will aid in compatibilizing the cellulose nanoparticles with various polymers including, for example, polyolefins such as polyethylene and polypropylene. The present disclosure thus provides methods for the use of reactive surface modification agents for aerosol-based compatibilization of fibers/particles with other materials. Similar approaches for other relatively fast chemical reactions are also disclosed in greater detail below, including utilization of plasma initiated reactions.

In embodiments, the NCC nanoparticles are functionalized with the silanes in an aerosol flow reactor (AFR). AFRs and their operation are within the purview of one skilled in the art. In general, the following processes occur at different time scales and locations within an AFR. The NCC nanoparticles to be functionalized are introduced into the AFR from a suitable source with one or more carrier gases in the form of an aerosol, with the component used to functionalize the surface of the nanoparticles, in embodiments at least one reactant like silane, introduced at the same point or downstream therefrom. Gaseous forms of at least one of the silanes noted above are included in the AFR. As the NCC nanoparticles travel through the AFR, they are contacted with the silanes in gaseous phase, and the silanes noted above may react with the NCC nanoparticles to functionalize the surface thereof. As would be readily apparent to a person of ordinary skill in the art, as the particle concentration increases, collisions between nanoparticles become more frequent and agglomeration may occur. Thus, in embodiments the particle concentration is kept low to maintain separation of the nanoparticles and permit surface functionalization to continue as the nanoparticles travel through the AFR.

Figure 1B:
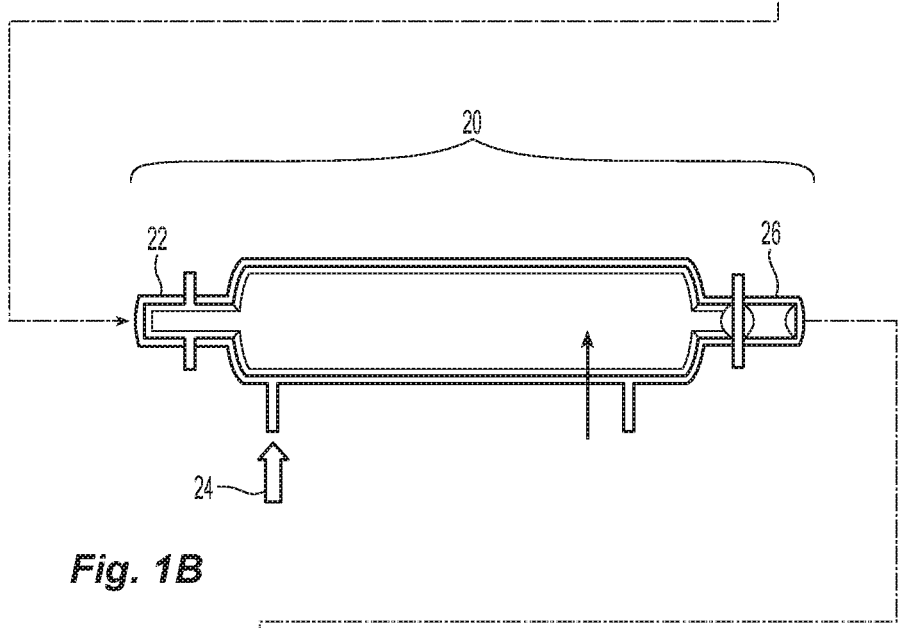
Figure 1C:
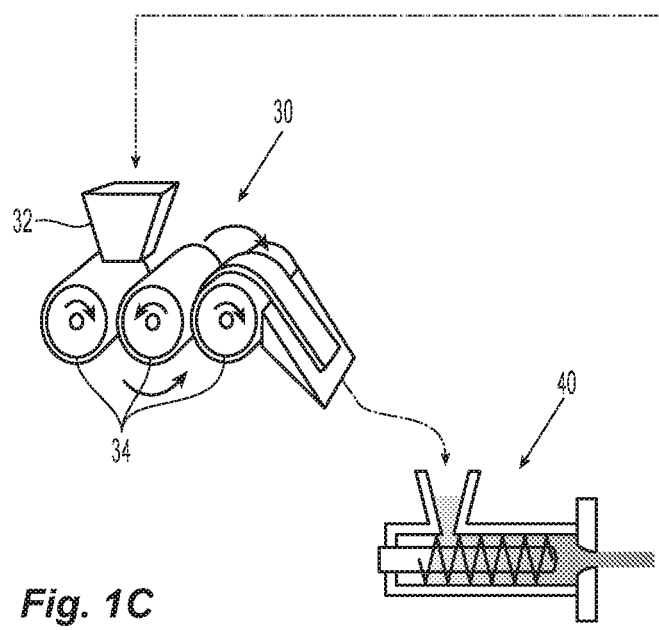

FIG. 1 shows a system of the present disclosure to chemically modify aerosols including nanocellulose nanoparticles, in flight, using an aerosol flow reactor (AFR). The AFR serves the purpose of exposing the aerosolized nanoparticles to controlled concentrations of the chemical reactant, in embodiments a silane, for a fixed reaction time. Generally, as depicted in FIG. 1A, an aerosol generator 10 includes an atomizer 12 and a diffusion dryer 14. The cellulose nanoparticles, in embodiments NCC nanoparticles, are thus introduced first into the atomizer 12, pass to the diffusion dryer 14, and then pass to the AFR 20. As depicted in FIG. 1B, the AFR 20 has an inlet 22 to receive the aerosolized nanoparticles from the aerosol generator 10, and an injector 24 by which the gaseous silanes are introduced into the AFR 20. The reaction between the NCC nanoparticles and silanes occurs within the AFR 20, with the functionalized nanoparticles exiting from the AFR 20 through an outlet 26. As described in greater detail below and as depicted in FIG. 1C, in embodiments the functionalized nanoparticles leave the AFR 20 through the outlet 26 into a high performance mixer 30 where they are combined with a polymer to form the polymer composite of the present disclosure, and then pass to an extruder 40 for final processing of the polymer composite.

While not shown in FIG. 1, to monitor these heterogeneous reactions between NCCs and the silanes, AFRs may be coupled to a chemical ionization mass spectrometer (CIMS) or proton-transfer time-of-flight mass spectrometers (PTR-ToF-MS) may be used to confirm the functionalization of the nanoparticles. The mass spectrometers are used to monitor in situ the changes in the concentration of reactive species due to reactive uptake by the nanoparticles.

The modification of the properties of the resulting functionalized NCC nanoparticles can be subsequently tuned by changing the residence time and reaction conditions in the AFR. These properties will be beneficial for the subsequent incorporation of the cellulose into various polymer matrices to fabricate nano composites. For example, suitable flow rates of the NCC nanoparticles in the AFR may be from about 1 cubic centimeter per minute (ccm) to about 10 cubic feet per minute (cfm), in embodiments from about 10 ccm to about 0.1 cfm. Suitable residence times of the NCC nanoparticles in the AFR may be from about 0.1 seconds to about 100 minutes, in embodiments from about 1 second to about 10 minutes. Suitable NCC particle concentrations in the AFR may be from about 1 parts per billion (ppb) to about 10000 parts per million (ppm), in embodiments from about 10 ppm to about 500 ppm. Suitable concentrations of the silanes in the AFR may be from about 1 ppb to about 10000 ppm, in embodiments from about 100 ppm to about 5000 ppm.

Suitable temperatures in the AFR may be from about 20° C. to about 250° C., in embodiments from about 30° C. to about 180° C.

Figure 2A:
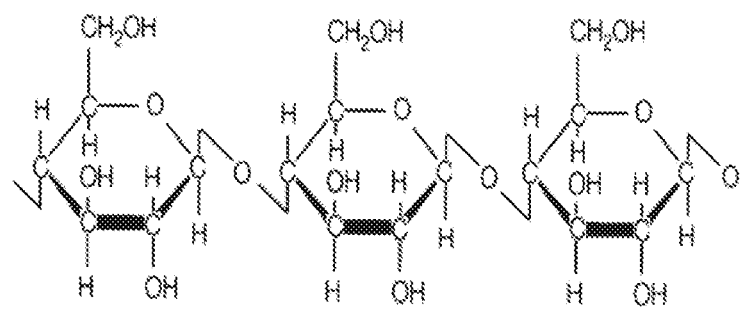
FIG. 2 is a depiction of the functionalization of cellulose with silanes in accordance with an embodiment of the present disclosure.
Figure 2B:
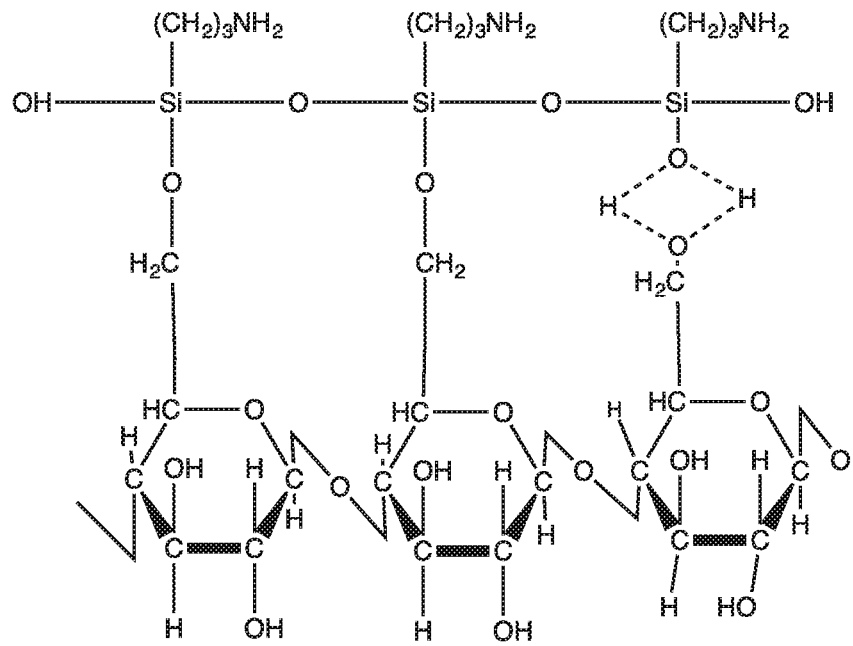

A summary of the chemical modification strategies for the cellulose nanoparticles is set forth in FIG. 2. FIG. 2A shows unmodified cellulose, and FIG. 2B shows the cellulose after modification with a silane.

The resulting functionalized nanoparticles, in embodiments NCC nanoparticles functionalized with silanes, may then be combined with polymers to form a composite. Polymers used to produce such polymer-particle composites can include, but are not limited to, polymers based on polylactic acid (PLA), polyethylene (PE), polypropylene (PP), acrylonitrile-butadiene styrene (ABS), polyvinyl alcohol (PVA), polyethylene terephthalate (PET) butyl rubber, natural rubber, polyacrylate, polyvinyl chloride, polysulfide, polystyrene, combinations thereof, and the like.

The resulting composites may possess the polymer in amounts from about 50% by weight to about 99.9% by weight of the polymer composite, in embodiments from about 75% by weight to about 99% by weight of the polymer composite, with the functionalized nanoparticles present in amounts from about 0.1% by weight to about 50% by weight of the polymer composite, in embodiments from about 1% by weight to about 25% by weight of the polymer composite.

In embodiments, the processes of the present disclosure for modifying nanoparticles may be part of an inline plastic manufacturing system, where the reactor utilized to modify the nanoparticles, in embodiments the AFR noted above, is coupled to polymer processing equipment. This concept is illustrated in FIGS. 1B-1C described above, which shows the AFR 20 (FIG. 1B) coupled to downflow processing equipment (FIG. 1C). Some examples of suitable downflow equipment include, but are not limited to, a twin screw mixer 30 coupled to an extruder 40 with an optional take off unit for producing films/ribbons of polymer composite. As described above, the NCC nanoparticles will pass through the AFR 20, where they are functionalized by the silane gases therein. After exiting from the AFR 20, as shown in FIG. 1C, the functionalized nanoparticles are deposited into a modified hopper 32 that feeds the target polymer into the twin screw mixer 30. The mixing rolls 34 combine the functionalized nanoparticles and polymer. The polymer feed rate will be adjusted according to functionalized nanocellulose output and the desired nanocellulose concentration of the final plastic composite product. In embodiments, a suitable feed rate may be from about 1 kilogram/hour (kg/h) to about 100 kg/h, in embodiments from about 3.5 kg/h to about 20 kg/h. This blend will pass through the screw mixer 30 to complete the compounding process with the final polymer composite ejected out of the extruder 40. Further processing, if required, can be applied to the extrudate.

In addition, although not shown, the twin screw extruder can be replaced with a planetary mixer, kneaders, or a roll mill as required by the target polymer matrix and resulting polymer composite to be produced.

Figure 3A:
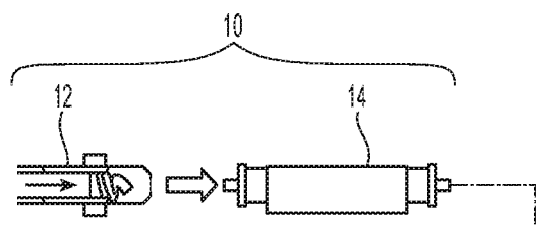
FIGS. 3A, 3B and 3C are depictions of an alternate embodiment of a system of the present disclosure for aerosol production (FIG. 3A) and plasma treatment of the aerosol (FIG. 3B), to downstream polymer/composite processing equipment (FIG. 3C) for manufacturing polymer nanocomposites of the present disclosure.
Figure 3B:
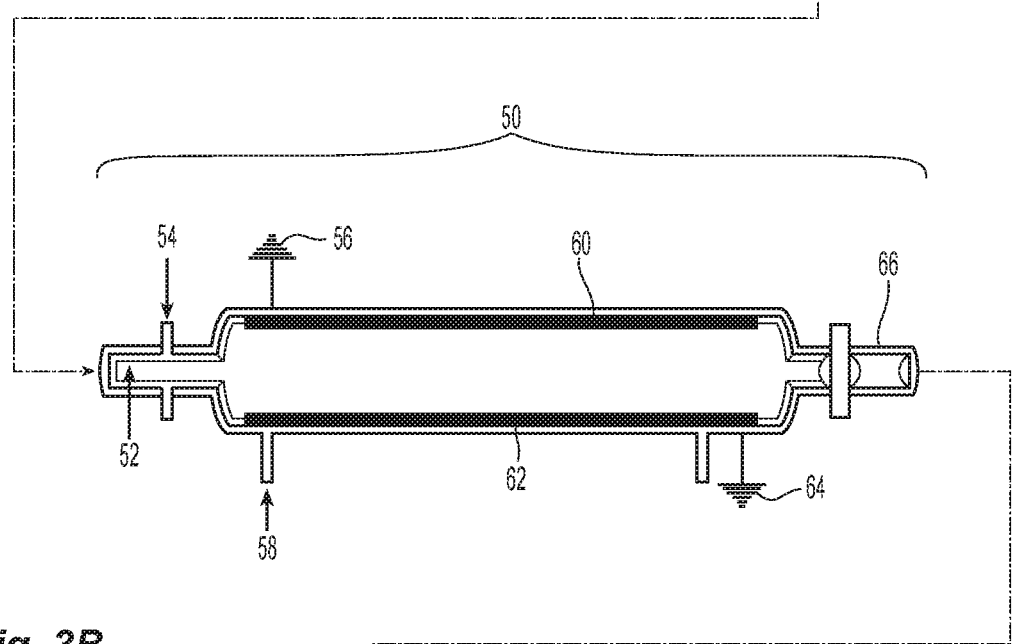
Figure 3C:
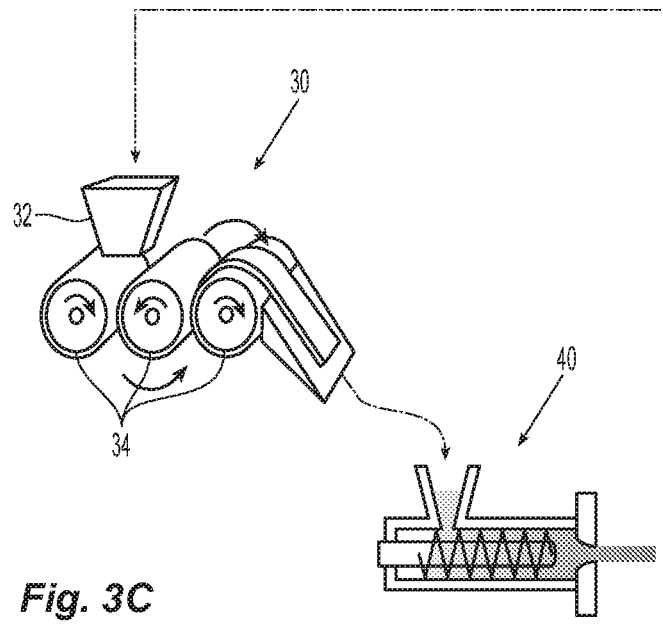

Accordingly, disclosed is an environmentally friendly gas-phase scalable method of modifying cellulose nanoparticles that does not rely on toxic solvents for nano composite manufacture. The present disclosure provides a modification of cellulose in aerosol form where the surface reactions can be performed in flight, keeping the cellulose nanoparticles well separated. This process is suitable using principles of atmospheric chemistry, where surfaces of organic aerosol nanoparticles are chemically modified by gas-phase reactants. The resulting polymer composites are a new generation of high performance polymer composites, with properties superior to the already existing solutions.

The disclosed technology addresses a key bottleneck of using NCC as a nano filler: poor compatibility of NCC with a polymer matrix. In general, poor dispersion of nano fillers and the resulting sub-optimal performance of the nano composites can be attributed to several factors, such as surface chemistry and processing aspects. A significant concentration of OH functional groups makes the cellulose surface hydrophilic, which leads to poor dispersion in hydrophobic polymer matrices such as polyethylene, polypropylene, and others. For example, published attempts to incorporate unmodified NCC into polyethylene and polypropylene matrices resulted in only marginal improvement in mechanical properties due to cellulose agglomeration.

Advantages of the process of the present disclosure include the ability to produce modified cellulosic nanoparticles in a gas phase, without the use of complex and expensive chemical treatment facilities that would be otherwise required in liquid phase modification processes. The process of the present disclosure not only modifies the nanoparticles in the gas phase but also keeps these modified nanoparticles well separated, thereby eliminating the costly intermediate processes of separating the modified nanoparticles, which is necessary in most liquid phase methods of particle processing. Furthermore, this technology is more environmentally friendly and uses less harmful chemicals for the modification of the nanoparticles compared with those used in most of the currently available techniques. Specific to this particular technology, the above mentioned method is also highly scalable as the components required for large scale manufacturing include a relatively simple flow reactor and flow control equipment.

In alternate embodiments, the present disclosure may use plasma to modify the surfaces of nanoparticles. Atmospheric (or non-thermal or cold) plasma treatment is an economical and environmentally friendly technique that can be used, in this embodiment, to modify the surface properties of a wide range of materials. Cold plasma enables dry surface modification only on the outermost surface layer of the materials being treated, without the risk of damaging the bulk material.

In embodiments, plasma treatment is applied to natural and naturally derived polymers, including cellulosic materials described above (such as, but not limited to, nanocrystalline cellulose (NCC) or naturally derived or artificially produced cellulosic materials), to change the surface chemistry of the NCC by inserting functional groups on the surface thereof, thereby obtaining various surface properties (including wetting and anti-soiling properties), depending on the desired final application.

The method of the present disclosure uses a relatively low temperature (as compared to other plasma techniques) and can be especially effective in treating surfaces of temperature sensitive materials, such as polymers which can be otherwise damaged by harsh treatments used by traditional chemical and thermal techniques.

As noted above, in accordance with the present disclosure, the plasma process includes surface treatment of the polymer nanoparticles utilizing reactive gases. Suitable reactive gases which may be used include oxygen, nitrogen, hydrogen, water ($H_2O$), carbon tetrachloride ($CCl_4$), tetrafluoromethane ($CF_4$), combinations thereof, and the like. Plasma treatment with these gases produces NCC nanoparticles having surface hydrophobicity and oleophobicity. This hydrophobicity and/or oleophobicity may be important in forming composite materials.

In embodiments, a suitable system for using plasma to modify the surface of the nanoparticles in flight is set forth in FIGS. 3A, 3B and 3C. The plasma is created in a low-pressure, inductively coupled radiofrequency (RF) reactor. Generally, as depicted in FIG. 3A, an aerosol generator 10 includes an atomizer 12 and a diffusion dryer 14. The NCC nanoparticles are first introduced into the atomizer 12, pass to the diffusion dryer 14, and then pass to the plasma reactor 50. As depicted in FIG. 3B, the plasma reactor 50 has an inlet 52 to receive the aerosolized nanoparticles, a vacuum source 54 close to the inlet 52, and an injector 58 by which the reactive gas radicals are introduced into the plasma reactor 50. The plasma reactor possesses electrodes 60 and 62 therein, as well as a ground 64 and an outlet 66. Plasma is generated inside the plasma reactor 50 using the two electrodes 60, 62 connected to a radiofrequency generator (not shown). The reaction between the NCC nanoparticles and the reactive gas radicals occurs within the plasma reactor 50, with the functionalized nanoparticles exiting the outlet 66. As described in greater detail below and as depicted in FIG. 3C, the functionalized nanoparticles leave the plasma reactor 50 through the outlet 66 into a high performance mixer 30, where they are combined with a polymer to form the polymer composite of the present disclosure, and then pass to an extruder 40 for final processing of the polymer composite.

The plasma reactor may also have inlets or similar components (not shown) to allow for the introduction of other reactants, catalytic moieties, and/or electromagnetic radiation, each of which may accelerate the modification process.

The treatment parameters within the plasma reactor 50 can be adjusted by varying specific frequencies, output power, gas pressures, and type of gases and their concentrations. For example, suitable frequencies in the plasma reactor may be from about 1 megahertz (MHz) to about 1000 MHz, in embodiments from about 27 MHz to about 100 MHz. Output power may be from about 25 watts (W) to about 50 kilowatts (kW), in embodiments from about 250 W to about 25 kW. Gas pressures may be from about 1 Pascal (Pa) to about 200 Pa, in embodiments from about 10 Pa to about 100 Pa. The types of gases may be oxygen, nitrogen, hydrogen, water ($H_2O$), carbon tetrachloride ($CCl_4$), tetrafluoromethane ($CF_4$), combinations thereof, and the like.

In addition, the treatment time and efficiency of treating the aerosolized nanoparticles, in embodiments NCC nanoparticles, can be tuned by controlling the flow rate, residence time, temperature and particle concentration in the plasma reactor. Suitable flow rates of the nanoparticles in the plasma reactor may be from about 1 ccm to about 10 cfm, in embodiments from about 10 ccm to about 0.1 cfm. Suitable residence times of the nanoparticles, in embodiments NCC nanoparticles, in the plasma reactor may be from about 0.1 seconds to about 100 minutes, in embodiments from about 1 second to about 10 minutes. Suitable temperatures in the plasma reactor may be from about 20° C. to about 250° C., in embodiments from about 25° C. to about 100° C. Suitable particle concentrations, in embodiments of NCC nanoparticles, in the plasma reactor may be from about 1 ppb to about 10000 ppm, in embodiments from about 10 ppm to about 5000 ppm.

All of the above parameters may be used to control the resulting hydrophobic and/or oleophobic properties of the functionalized nanoparticles.

The plasma modification of the nanoparticles (unmodified or pre-modified/pre-functionalized) within the reactor occurs in flight. This can be done in multiple ways including, but not limited to, premixing the cellulosic nanoparticles and working gas before pumping this mixture into the plasma reactor; simultaneously injecting the aerosolized cellulosic nanoparticles into the plasma reactor along with the reactive gas; or injecting the aerosolized cellulosic nanoparticles after the reactive gas is pumped into the plasma reactor.

In embodiments, the aerosolized nanoparticles and reactive gas can be introduced into the flow reactor before or during the plasma field generation, adding another level of flexibility and control to the modification process.

The functionalized nanoparticles thus produced may be combined with various polymers to form a polymer composite including the functionalized cellulose nanoparticles. Polymers used to produce such polymer-particle composites can include, but are not limited to, polymers based on polylactic acid (PLA), polyethylene (PE), polypropylene (PP), acrylonitrile-butadiene styrene (ABS), polyvinyl alcohol (PVA), polyethylene terephthalate (PET) butyl rubber, natural rubber, polyacrylate, polyvinyl chloride, polysulfide, polystyrene, combinations thereof, and the like.

The resulting composites may possess the polymer in amounts from about 50% by weight to about 99.9% by weight of the polymer composite, in embodiments from about 75% by weight to about 99% by weight of the polymer composite, with the functionalized nanoparticles present in amounts from about 0.1% by weight to about 50% by weight of the polymer composite, in embodiments from about 1% by weight to about 25% by weight of the polymer composite.

In embodiments, systems of the present disclosure include the above-described plasma reactor to modify the nanoparticles, coupled to polymer processing equipment. These systems provide a combined method of surface modification coupled to downstream polymer processing to produce composite materials, where modified nanoparticles will flow directly into a polymer matrix. In other words, both filler modification and the use of the resulting filler in synthesizing nanocomposites occurs as part of a single process in a system of the present disclosure, thereby removing the need for multiple processing stages.

As depicted in FIGS. 3B and 3C, in addition to the aerosolized particle modification with cold plasma, the present disclosure combines the resulting functionalized nanoparticles with the polymer described above to form a polymer composite of the present disclosure, by directly coupling the plasma reactor (FIG. 3B) to other polymer processing equipment (FIG. 3C). Some examples of suitable downflow equipment include, but are not limited to, a twin screw mixer 30 coupled to an extruder 40 with an optional take off unit for producing films/ribbons of polymer composite. As described above and as depicted in FIG. 3B, the nanocellulose nanoparticles will pass through the plasma reactor 50, where they are functionalized by the reactive gases therein. After exiting from the plasma reactor 50, as shown in FIG. 3C, the functionalized nanoparticles are deposited into a modified hopper 32 that feeds the target polymer into the twin screw mixer 30. The mixing rolls 34 combine the functionalized nanoparticles and polymer.

The polymer feed rate will be adjusted according to functionalized nanocellulose output and the desired nanocellulose concentration in the final plastic composite product. In embodiments, a suitable feed rate may be from about 1 kg/h to about 100 kg/h, in embodiments from about 3.5 kg/h to about 20 kg/h. This blend will pass through the screw mixer 30 to complete the compounding process with the final polymer composite ejected out of the extruder 40. Further processing, if required, can be applied to the extrudate.

In addition, although not shown, the twin screw extruder can be replaced with a planetary mixer, kneaders, or a roll mill as required by the target polymer matrix and resulting polymer composite to be produced.

The resulting method and system provides for gas phase, in-flight plasma modification of nanoparticles along with single step downstream composite processing.

In accordance with the present disclosure, surface modification of nanoparticles using cold plasma technology may be used to introduce hydrophobicity onto the surface of the nanoparticles in flight. Cold plasma technology can be a very powerful technique, given that the depth of plasma-induced modifications is only a few nanometers, leaving the inner structure of the sample intact. Similar to the chemical modification method described above for chemical modification in an AFR, in this embodiment the controlled modification of cellulosic nanoparticles in aerosolized form occurs with the use of cold plasma treatment in a reactor. The present disclosure provides plasma treatment methodology to aerosolized nanoparticles including, but not limited to, cellulosic materials (such as NCC), which, similar to the chemical modification described above, can be modified in flight. The resulting plasma generation will facilitate surface modification with the reactive gases noted above, which are fed into a reactor. The plasma power can be adjusted to required values of nanocellulose treatment time. The flow rate can also be varied to achieve the desired degree of surface modification. As a result of this modification, the treated samples will possess different degrees of hydrophobicity depending on processing parameters.

General advantages of all of the disclosed methods include the direct coupling of downstream composite processing step with nanoparticles originated from the flow reactor and/or plasma reactor described above. This streamlined manufacturing process permits the elimination of steps such as the collection, transportation and sample preparation steps traditionally needed when fillers are produced prior to their introduction in a final composite product.

The resulting polymer nanocomposites, whether produced in the flow reactors or plasma reactors described above, may find various uses, depending upon the polymers used, the functionalized nanoparticles, the amounts of each, processing conditions, and the like. In embodiments, polymer nanocomposites produced in accordance with the present disclosure may be used in various fields such as aerospace, automotive, construction, packaging industries for structural and non-structural parts.

The following Examples are provided to illustrate, but not to limit, the features of the present disclosure so that those skilled in the art may be better able to practice the features of the disclosure described herein.

Example 1

Figure 4A:
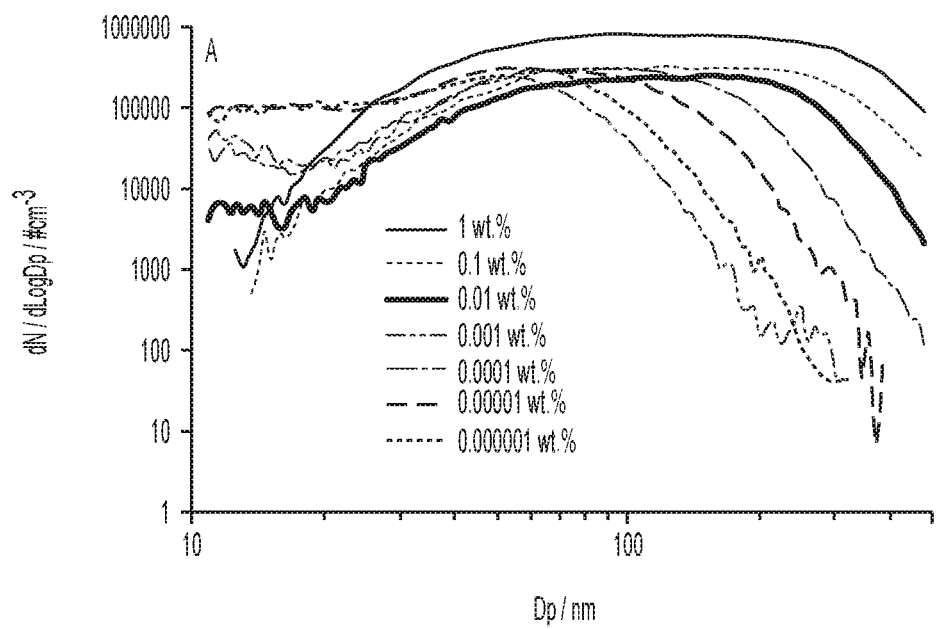
FIG. 4A is a size distribution spectra of atomized aqueous nanocellulose solutions of different weights (by percent) used to form nanoparticles of the present disclosure.

The reactor setup depicted in FIG. 1A was employed to aerosolize NCC nanoparticles. Gas-phase nanocellulose nanoparticles of known particle diameter and concentration, quantified based on their size and number concentration using a scanning mobility particle sizer (SMPS) as shown in the size distribution spectrum in FIG. 4A, were used. The number weighted mean particle diameter of the nanocellulose solution (after passing through the aerosolizer) was observed to be about 50 nm. The measurements indicated that under experimental conditions, atomization of highly dilute (~10-6 wt. %) aqueous nanocellulose solutions produced dry nanocellulose nanoparticles of ~50 nm in diameter. Atomization produced small aqueous droplets that, upon drying, left behind the non-volatile material, e.g. cellulose. Depending on its concentration in solution, the resulting dry particle diameters varied; the higher concentration resulted in larger diameter nanoparticles.

Figure 4B:
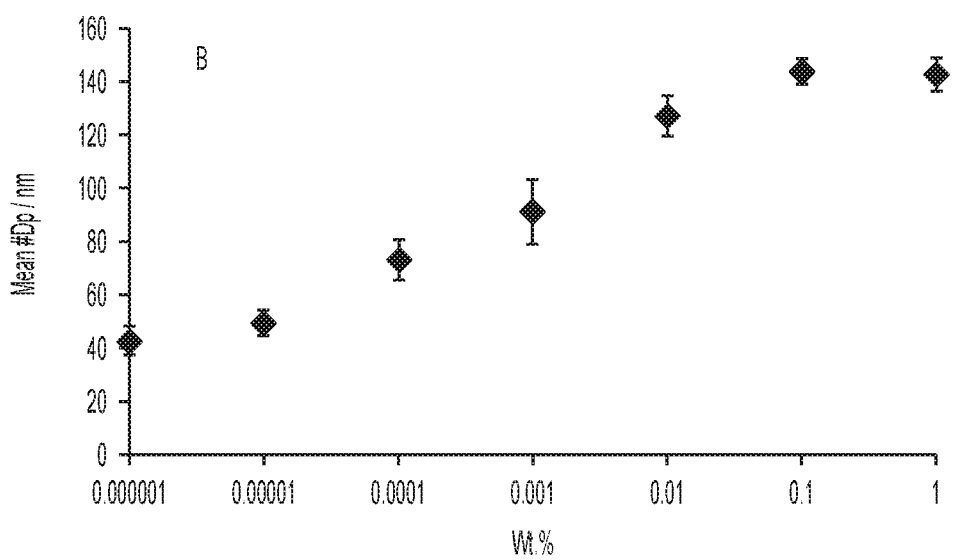
FIG. 4B is a size distribution spectra showing number-weighted mean particle diameter as a function of weight percent of these solutions.

FIG. 4B shows mean particle diameter (Dp) of the NCC as a function of solution wt. %. As illustrated in FIG. 4B, Dp varied by a factor of four, allowing precise and variable control of particle size and concentration. In addition, quantification of gas phase (3-aminopropyl)triethoxysilane (APS) molecules, by characterization methods like fourier transform infrared spectroscopy (FTIR), mass spectrometry (MS), gas chromatography (GC) coupled with various detectors (TCD, FID, etc.) or a combination of these techniques, suggested that the concentration in the gas phase could be tuned by modifying the flow of carrier gas via a mass flow controller. These results demonstrate the ability to deliver and to quantify aerosol based NCC.

Example 2

Experiments on gas phase functionalization of NCC with APS showed promising results as observed by Fourier transform infrared (FTIR) spectroscopy. These experiments were conducted on the nanoparticles produced in Example 1 as a proof of concept evaluation to verify the feasibility of gas phase modification of NCC with (3-aminopropyl)triethoxysilane (APS). One gram of freeze dried nanocellulose was loaded into a micro reactor as depicted in FIG. 1 and exposed to a flow of hydrolyzed APS for 8 hours. The materials were introduced into the AFR and passed therethrough at flow rate of 10 ccm, 25° C. and 10% w/w APS concentration.

Figure 5:
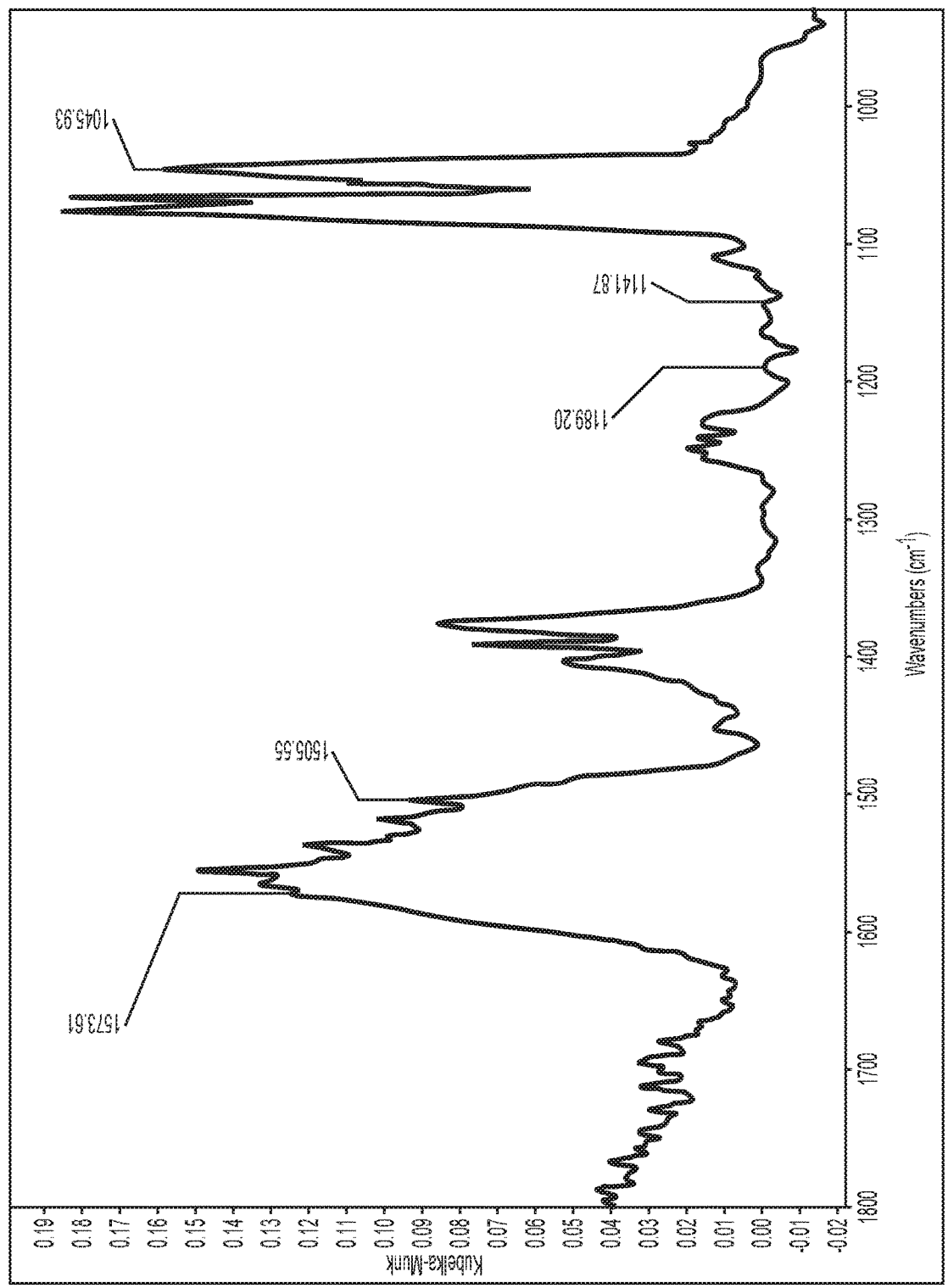
FIG. 5 is an FTIR spectra of nanocellulose modified with 3-aminopropyl triethoxysilane ("APS").

The resulting functionalized nanocellulose sample was subsequently analyzed by Diffuse Reflectance Fourier Transform Spectroscopy (DRIFTS) to determine changes in the IR spectra attributable to the APS reaction with the NCC nanoparticles. The subtraction spectra of the APS modified nanocellulose is shown in FIG. 5. The bands at 1575 and 1484 $cm^{-1}$ were typical of the deformation modes of the $NH_2$ groups that were hydrogen bonded to the OH functions of both silanol moieties and cellulosic substrate. The peaks around 1190 and 1140 $cm^{-1}$, were related to the —Si—O—Si— linkage and —Si—O— cellulose bonds, while the Si—O—Si band was located at 1040 $cm^{-1}$. These results demonstrate the capability to functionalize NCC using APS.

While the above description contains many specific details of methods in accordance with this disclosure, these specific details should not be construed as limitations on the scope of the disclosure, but merely as exemplifications of preferred embodiments thereof. Those skilled in the art will envision many other possible variations that are all within the scope and spirit of the disclosure.

What is claimed is:

1. A method comprising:
    aerosolizing cellulose nanoparticles;
    introducing the aerosolized cellulose nanoparticles into a plasma flow reactor possessing at least two electrodes therein;
    introducing reactive gas radicals into the plasma flow reactor;
    allowing the reactive gas radicals to functionalize the surface of the cellulose nanoparticles as they pass through the plasma flow reactor to produce functionalized cellulose nanoparticles; and
    collecting the functionalized cellulose nanoparticles.

2. The method of claim 1, wherein the temperature in the plasma flow reactor is from about 20° C. to about 250° C.

3. The method of claim 1, wherein the flow rate of the aerosolized cellulose nanoparticles in the plasma flow reactor is from about 1 cubic centimeters per minute to about 10 cubic feet per minute.

4. The method of claim 1, wherein the residence time of the aerosolized cellulose nanoparticles in the plasma flow reactor is from about 0.1 second to about 100 minutes.

5. The method of claim 1, wherein the concentration of the aerosolized cellulose nanoparticles in the plasma flow reactor is from about 1 part per billion to about 10000 parts per million.

6. The method of claim 1, wherein the reactive gas radicals are derived from gases selected from the group consisting of oxygen, nitrogen, hydrogen, water, carbon tetrachloride, tetrafluoromethane, and combinations thereof.

7. The method of claim 1, wherein the frequency in the plasma flow reactor is from about 1 MHz to about 1000 MHz.

8. The method of claim 1, wherein the output power of the plasma flow reactor is from about 25 W to about 50 kW.

9. The method of claim 1, wherein the gas pressure in the plasma flow reactor is from about 1 Pa to about 200 Pa.

10. The method of claim 1, further comprising combining the collected functionalized cellulose nanoparticles with a polymer to form a polymer composite.

11. The method of claim 10, wherein the polymer is based upon a polymer selected from the group consisting of polylactic acid, polyethylene, polypropylene, acrylonitrile-butadiene styrene, polyvinyl alcohol, polyethylene terephthalate, butyl rubber, natural rubber, polyacrylate, polyvinyl chloride, polysulfide, polystyrene, and combinations thereof.

12. The method of claim 10, wherein the collected functionalized cellulose nanoparticles are combined with the polymer at a polymer feed rate from about 1 kilogram/hour to about 100 kilograms/hour.

13. The method of claim 10, wherein the polymer composite includes the polymer in amounts from about 50% by weight to about 99.9% by weight of the polymer composite.

14. The method of claim 10, wherein the polymer composite includes the functionalized cellulose nanoparticles in amounts from about 0.1% by weight to about 50% by weight of the polymer composite.

\* \* \* \* \*